United States Patent [19]

Hara et al.

[11] Patent Number: 5,119,222

[45] Date of Patent: Jun. 2, 1992

[54] FAULT EXAMINING APPARATUS FOR LOOP-SHAPED DATA TRANSMISSION SYSTEM USING OPTICAL FIBER

[75] Inventors: Yoshifumi Hara, Hirakata; Tutomu Sakurai, Ikoma; Saburo Kubota, Katano, all of Japan

[73] Assignee: Matsushita Electrical Industrial Co. Ltd., Oazakadoma, Japan

[21] Appl. No.: 372,636

[22] Filed: Jun. 28, 1989

[30] Foreign Application Priority Data

Jun. 29, 1988 [JP] Japan .................. 63-161614

[51] Int. Cl.⁵ .............................. H04B 10/08
[52] U.S. Cl. ........................ 359/110; 359/165
[58] Field of Search .................. 455/606-608, 455/612, 617, 619, 600; 370/1, 3, 4

[56] References Cited

U.S. PATENT DOCUMENTS

| | | | |
|---|---|---|---|
| 3,799,675 | 3/1974 | Johnson et al. | 455/617 |
| 4,257,125 | 3/1981 | Theall, Jr. | 455/619 |
| 4,648,135 | 3/1987 | Labram | 455/619 |
| 4,715,028 | 12/1987 | McMahon | 370/3 |

FOREIGN PATENT DOCUMENTS

| | | |
|---|---|---|
| 2568431-A1 | 7/1984 | France . |
| 56-98044A | 8/1981 | Japan . |
| 2019167A | 4/1979 | United Kingdom . |

OTHER PUBLICATIONS

"TAT-8 Supervisory Subsystem"; British Telecommunications Engineering, vol. 5, Jul. 1986; pp. 153-157.

Primary Examiner—Curtis Kuntz
Assistant Examiner—L. Pascal

[57] ABSTRACT

A fault examining apparatus is provided in a loop network system, in which a master station is connected sequentially with a plurality of follower stations in a loop transmission path to transfer digital optical signals denoting serial data information from the master station to the follower stations, from the follower stations to the follower stations or from the follower stations to the master station. The apparatus includes a device for detecting and storing a present value, a maximum value and a minimum value of a peak level value of received optical signals, and a display device for displaying the values.

3 Claims, 11 Drawing Sheets

Fig. 2 start bit → | parity bit
| mode portion | address portion | data portion |
|---|---|---|
| STA | M2 M1 M0 | A3 A2 A1 A0 | D7 D6 D5 D4 D3 D2 D1 D0 | PAR |

| mode portion | contents | IN signal | OUT signal | RIN signal | XIN signal | NIN signal | RS signal |
|---|---|---|---|---|---|---|---|
| 0 0 1 | input input-signal as data. | 1 | 0 | 0 | 0 | 0 | 0 |
| 0 1 0 | output data as output signal. | 0 | 1 | 0 | 0 | 0 | 0 |
| 1 0 0 | input peak value of receiving signal as data. | 0 | 0 | 1 | 0 | 0 | 0 |
| 1 0 1 | input maximum value of peak value as data. | 0 | 0 | 0 | 1 | 0 | 0 |
| 1 1 0 | input minimum value of peak value as data. | 0 | 0 | 0 | 0 | 1 | 0 |
| 1 1 1 | reset memory of maximum value and minimum value. | 0 | 0 | 0 | 0 | 0 | — |

FAULT EXAMINING APPARATUS FOR LOOP-SHAPED DATA TRANSMISSION SYSTEM USING OPTICAL FIBER

BACKGROUND OF THE INVENTION

The present invention generally relates to a fault examining apparatus for a loop network system in which a master station is sequentially connected with a plurality of follower stations into a loop network using a single transmission path to transmit digital signals with serial information from the master station to the follower stations, from the follower stations to the follower stations or from the follower stations to the master station.

In recent years, as microprocessor technology has advanced, the functions and utility of automatic machines for industry use has advanced. It is not uncommon that the number of sensors and actuators used in such machines exceeds 100. Once automatic machines are lined within factories, mutual information exchanges and the information exchanges between computers for controlling production lines and the automatic machines are required to be effected without fail. In order to reduce the wirings within such facilities a described hereinabove or among such facilities, inputting, outputting control units (remote I/O) are installed within the facilities as the follower stations so as to connect with the follower stations the sensors, the actuators, and the signal lines of the communication information, while a connection is effected using only one optical fiber cable to a master station leading to the microprocessors for effecting the overall control operation so as to serially transfer the information.

Figure 9:
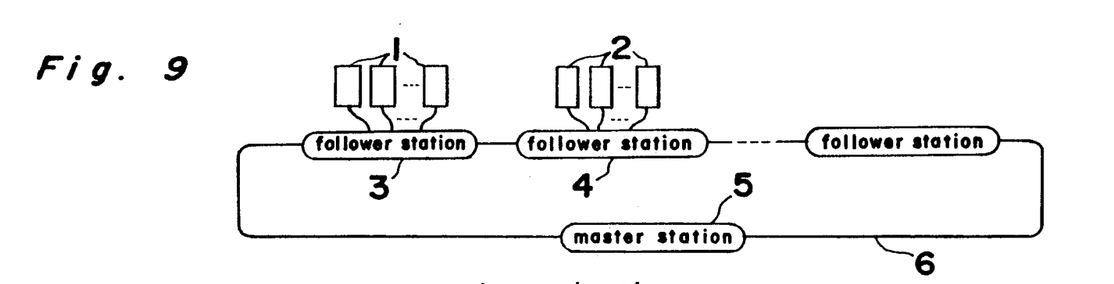
FIG. 9 is a block diagram of the conventional loop-network data transmission apparatus.

FIG. 9 shows a system diagram having the remote I 10 units, wherein an input unit 3 and an output unit 4 are referred to hereinafter as follower stations, with sensors 1 and actuators 2 such as electromagnetic valves, and an optical fiber 6 being provided. A controller 5 for controlling all of the follower stations is called a master station.

Figure 10:
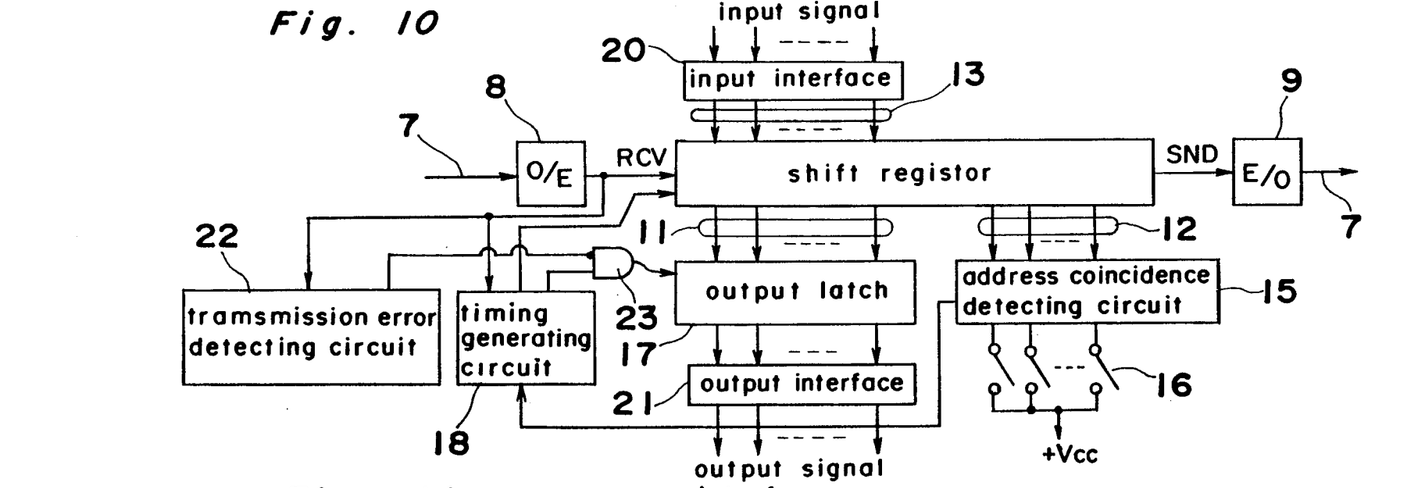
FIG. 10 is a circuit block diagram of the conventional follower station.
Figure 11:
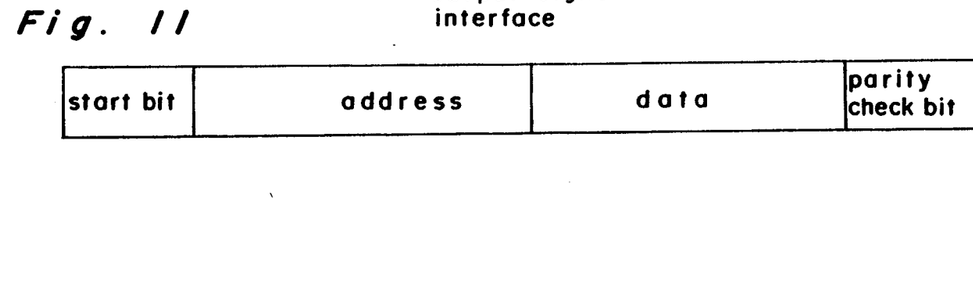
FIG. 11 is a chart for showing the conventional transmission format.

FIG. 10 shows a schematic block diagram of the follower stations in the conventional embodiment. The control information from the master station is transferred to the follower stations as serial information composed of pulses as the intermittent signals of light. The transmission format of the serial information is composed of a start bit to allow a follower station to detect the head bit of the serial information, an address portion as the control information, a data portion, and a parity check bit for detecting the transmission error of the signals as shown in FIG. 11. In FIG. 10, reference numerals 7, 8, 9 show an optical fiber, an (optical-to-electrical) transducer, and an (electrical-to-optical) transducer, respectively. The input signals are connected to the sensors 1 of FIG. 9, while the output signals are connected to the actuators 2. All of the serial received signals RCV changed into electrical signals are once stored in a shift resister, wherein a serial.parallel conversion and a parallel.serial conversion may be effected. A circuit 15 checks whether or not the value of the address portion converted into a serial.parallel format conforms to the value of the address of the follower station established by the switch 16. When it is detected that the unit is accessed by an address conformity detecting circuit 14 after it is once stored in the shift register 14, the memory of the output data 11 of the shift register is effected by an output latch 17. The data portion of the serial information once stored within the shift register 14 is replaced into the input data 13 in accordance with the input signal so as to effect the parallel.serial conversion again for the transmission thereof as the transmission signal SND. When the address is not in conformity, it is transmitted through the parallel.serial conversion as it is. A timing pulse generating circuit 18 effects the controlling operation in the above-described procedure.

Only when through the above-described construction, the serial information transmitted from the master station of FIG. 9 is transmitted in order from the follower station to the follower station to come into conformity with the established address of the follower station, the input data of the follower station is sent into the optical fiber as the serial information and is returned into the master station. The master station decodes the address portion and the data portion of the returned serial information.

A transmission error detecting circuit 22 is adapted to detect the transmission error of the serial information. This circuit 22 detects whether the total sum of the bit numbers with the address portion and the data portion in the serial information being 1 is odd or even in number, and generates a transmission error signal if a predetermined parity error continues to be generated. In a gate circuit 23, the output of the latch pulse into the output latch 17 is stopped when the transmission error is generated and the output signal is retained in the previous condition. When the transmission error has been detected, the follower station transmits a received signal having an error as it is with respect to the next follower station. Accordingly, even in the master station, the signal returned by way of many follower stations is checked with the same circuit as the transmission error detecting circuit 22 being built in so as to detect that the transmission error has been generated within this loop.

It is to be noted that the main causes for generating transmission errors are a strong noise presence with respect to the electric circuits of the follower stations, a wiring condition of the optical fiber cables, changes in the bending condition of the optical cables with the cables being wired in a movable portion, and the received signal level of the optical signal of the follower station being beyond the proper range caused by an impropriety in the splicing portion of the light connector.

However, in above-described construction, if the master station can find the transmission error through a check of the returned signal, it cannot be easily checked how the level of the received signal under the conditions where the transmission error is likely to be generated is provided in an optional follower station. It is necessary to manually measure the level of the received signal in the follower station with a light-amount measuring instrument in order to have another look at the wiring of the optical fiber cable and the splicing portion of the optical connector when the level of the received signal at the follower station is excessively large or small. As a means for outputting the level of the received signal with respect to an optional follower station from the master station is not provided, the above-described operation is required to be effected one by one with respect to the follower stations in order to see which follower station within the loop is inferior in the wiring condition thereof, thus requiring increased time and labor consumption.

SUMMARY OF THE INVENTION

Accordingly, an object of the present invention is to provide a fault examining apparatus for a loop-shaped data transmission system using an optical fiber, which is capable of, on each of the follower stations, detecting the received-light-amount levels of the received optical signals so as to store the maximum value and the minimum value of the received-light-amount levels of the optical signals received one after another, so that the master station may read the values in the serial information so as to examine the fault.

Another object of the present invention is to provide a fault examining apparatus for a loop-shaped data transmission system using an optical fiber, which is capable of effecting the above-described judgments even at the follower station the provision, at the follower stations, of a received-light-amount level display instrument for effecting renewals at each reception and a display instrument of the maximum light level values and the minimum values.

In accomplishing these and other objects, according to one preferred embodiment of the present invention, there is provided a loop-shaped data transmission system which is capable of transmitting and receiving the serial information and decoding it, with one master station being connected with a plurality of follower stations in a loop optical transmission path. In a first embodiment, the follower station is composed of a means for detecting and storing as the received-light-amount level the peak value of the received signal at the moment of the serial information composed of pulse rows of intermittent signals of light, and a display instrument for displaying the values.

A second embodiment is composed of a means for rewriting it into the value of this time so as to store it if the received-light-amount level received this time is larger through the comparison of the detecting means output at the received-light-amount level of the serial information at that moment with a maximum value given so far in the received-light-amount level received before that, a means for rewriting into the received-light-amount level of this time if the received-light-amount level received this time is smaller through the comparison of the output thereof likewise with a minimum value given so far, and a display instrument for displaying the above-described three peak values.

In a third embodiment and a fourth embodiment, the content of the serial information is composed of an address portion for specifying the conventional particular follower station, a data portion and a mode portion added into it so as to load from the master station the level of the received-light-amount of the follower station corresponding to the first and second inventions. In the follower station, there are a means for detecting the value of the new received portion of the received-light-amount level of the received signal, a minimum value, a maximum value given up to that time point so as to turn them into digital values for storing them, and a means for coding the contents of the mode portion of the serial information to distinguish the cases among (1) a case of reading the received-light-amount level of the new received signal, (2) a case of reading the maximum value provided up to this time, (3) a case of reading the minimum value provided up to this time, and (4) a case of resetting the memories of the maximum value and the minimum value, for replacing the data portion of the serial information into the received-light-amount level in accordance with each of the above-described cases (1) through (3) so as to transmit it. The master station is composed of a means for transmitting the serial information having the contents of the mode portion, a means for decoding the returned serial information so as to load, as the digital values, the level of the received-light-amount of the received signal of each follower station, a means for deciding whether the value is higher or lower as compared with the proper level, and a display means for displaying the results together with the address of the follower station.

In the first embodiment of the present invention, the level of the received-light-amount is renewed and displayed every time each follower station receives the serial information. A follower station which cannot effect the normal data transmission may be found easily through judgment as to whether or not the display value stays within the proper range. Thus, main causes such as inferior wirings of the optical fibers, inferior connector portions, light-emitting power shortage of the previous follower station are easier to find. The failures of the whole transmission system may be prevented from being effected through the above-described coping operation before the received-light-amount level becomes completely abnormal.

In the second embodiment of the present invention, as the display content of the level of the received-light-amount of the follower station, there are shown the maximum value and the minimum value before that time, in addition to the present value which is a value for each reception. When the long hours' surrounding noises changes or the bending condition changes with the optical fiber being mounted on a movable portion, the varying range of the level of the received signal can be seen, so that it is easier to make sure of a measure for improving the reliability of the transmission of the system, and the effects thereof.

According to the third and fourth embodiments of the present invention, the master station can load at an optional timing the level of the received-light-amount of the follower station by the change in the contents of the mode portion and the address portion of the serial information, and display the value thereof together with the address of the follower station. The levels of the received-light-amount of the follower stations may be seen collectively in the established place of the master station although the user does not go near the follower station on purpose, so that the transmission system may be easily maintained.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Before the description of the present invention proceeds, it is to be noted that like parts are designated by like reference numerals throughout the accompanying drawings.

Figures 1, 1B:
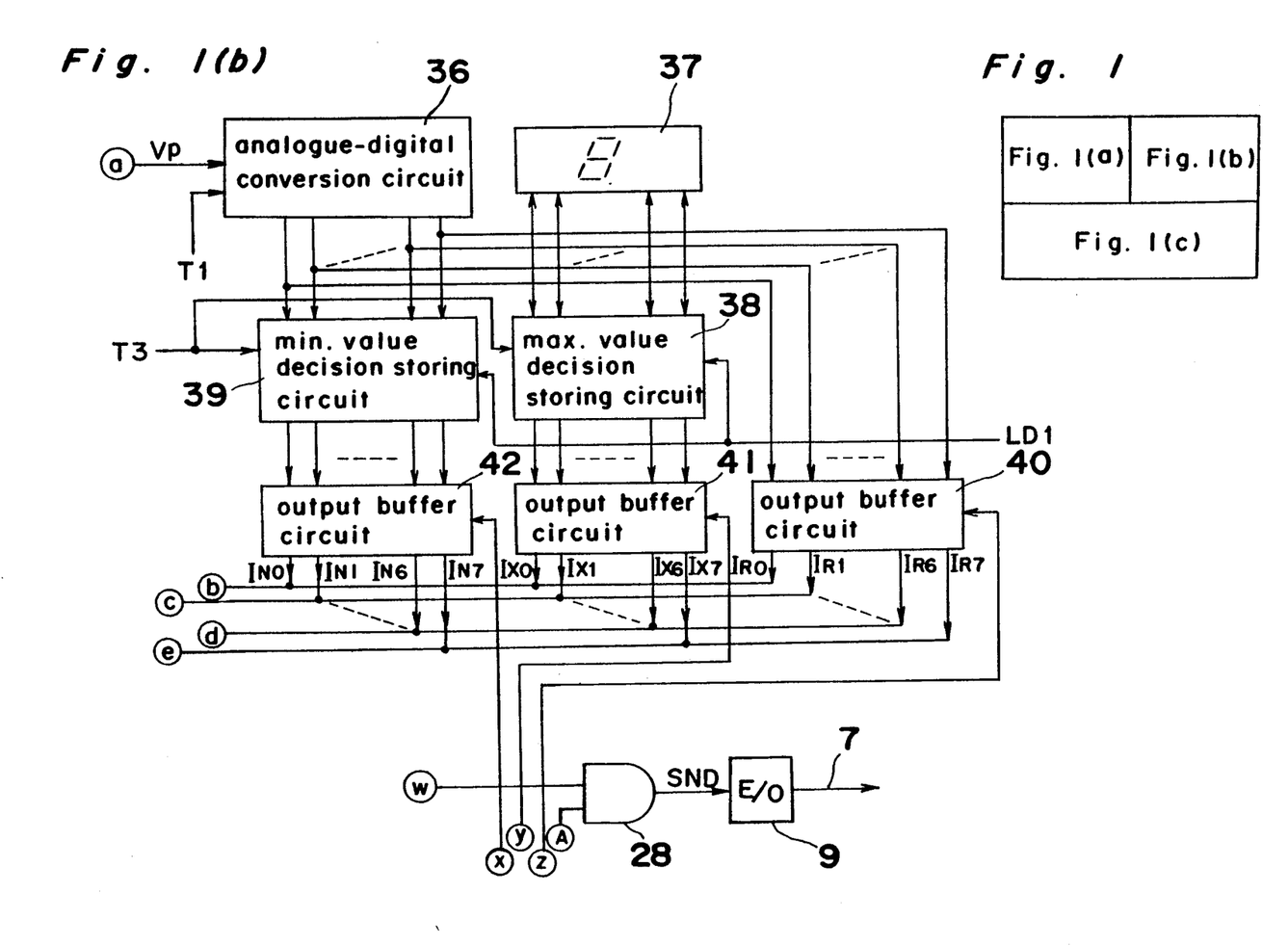
FIGS. 1, 1a, 1b and 1c are circuit block diagrams of a follower station in an embodiment of the present invention.
Figure 1A:
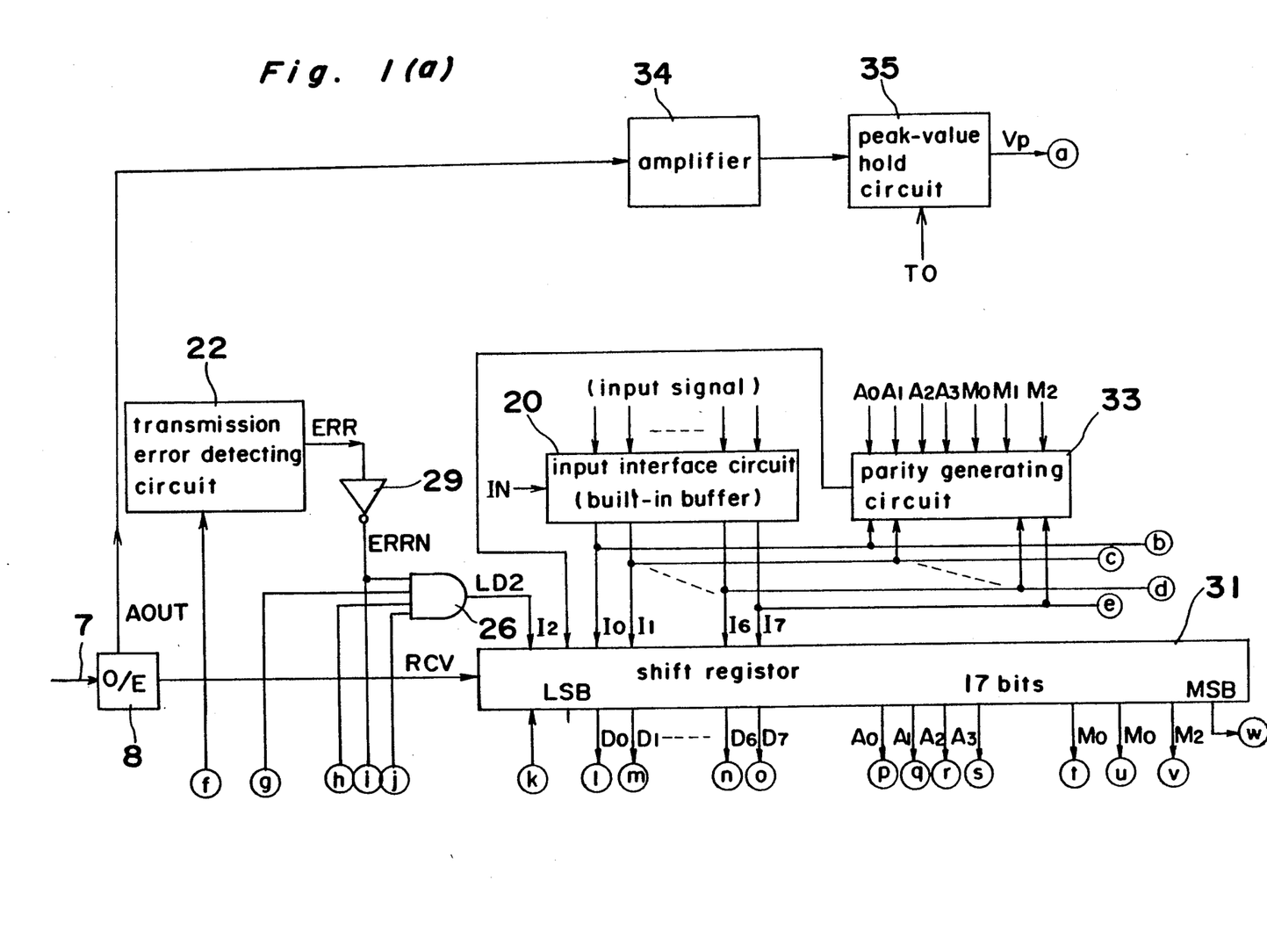
Figure 1C:
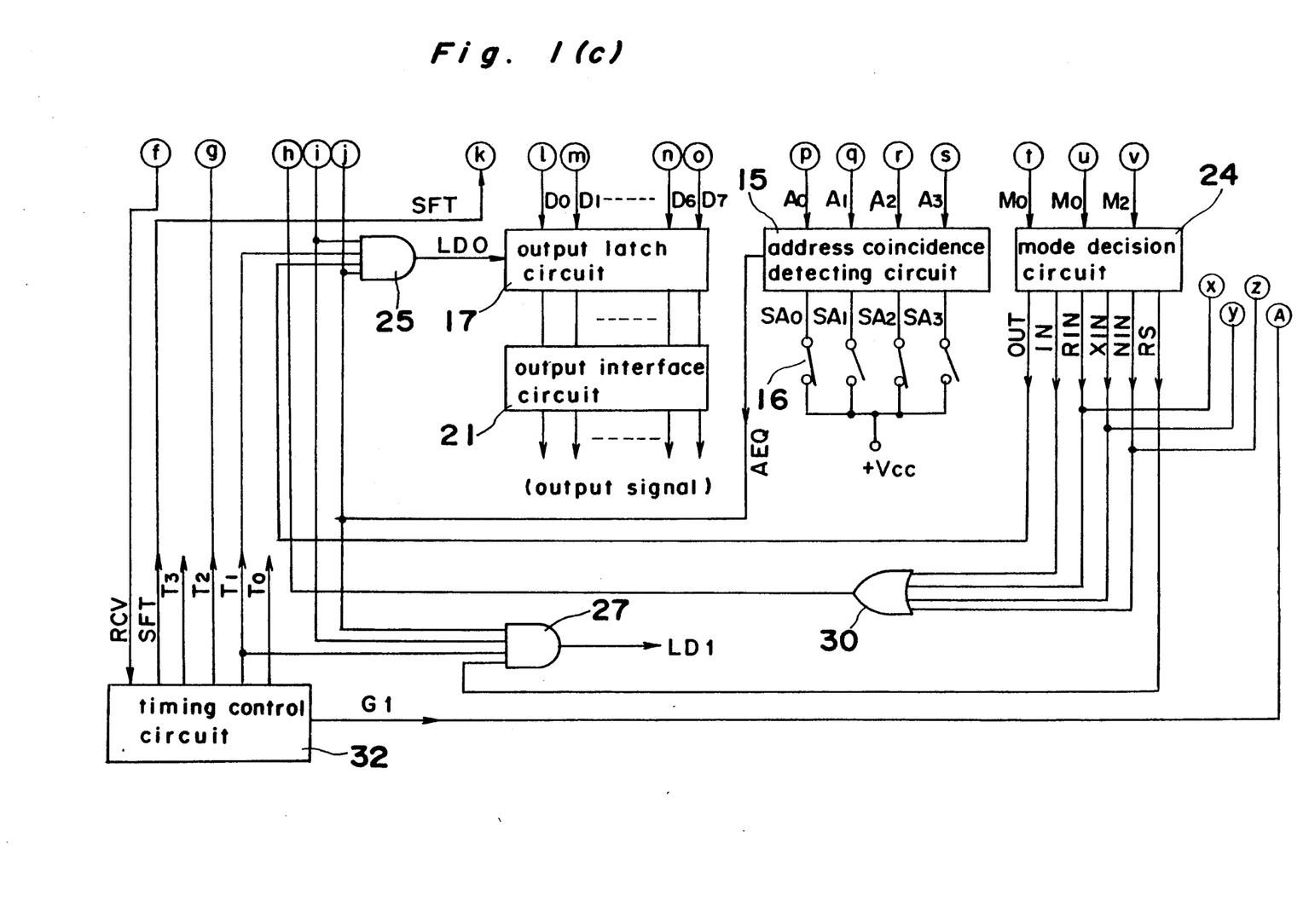
Figure 2:
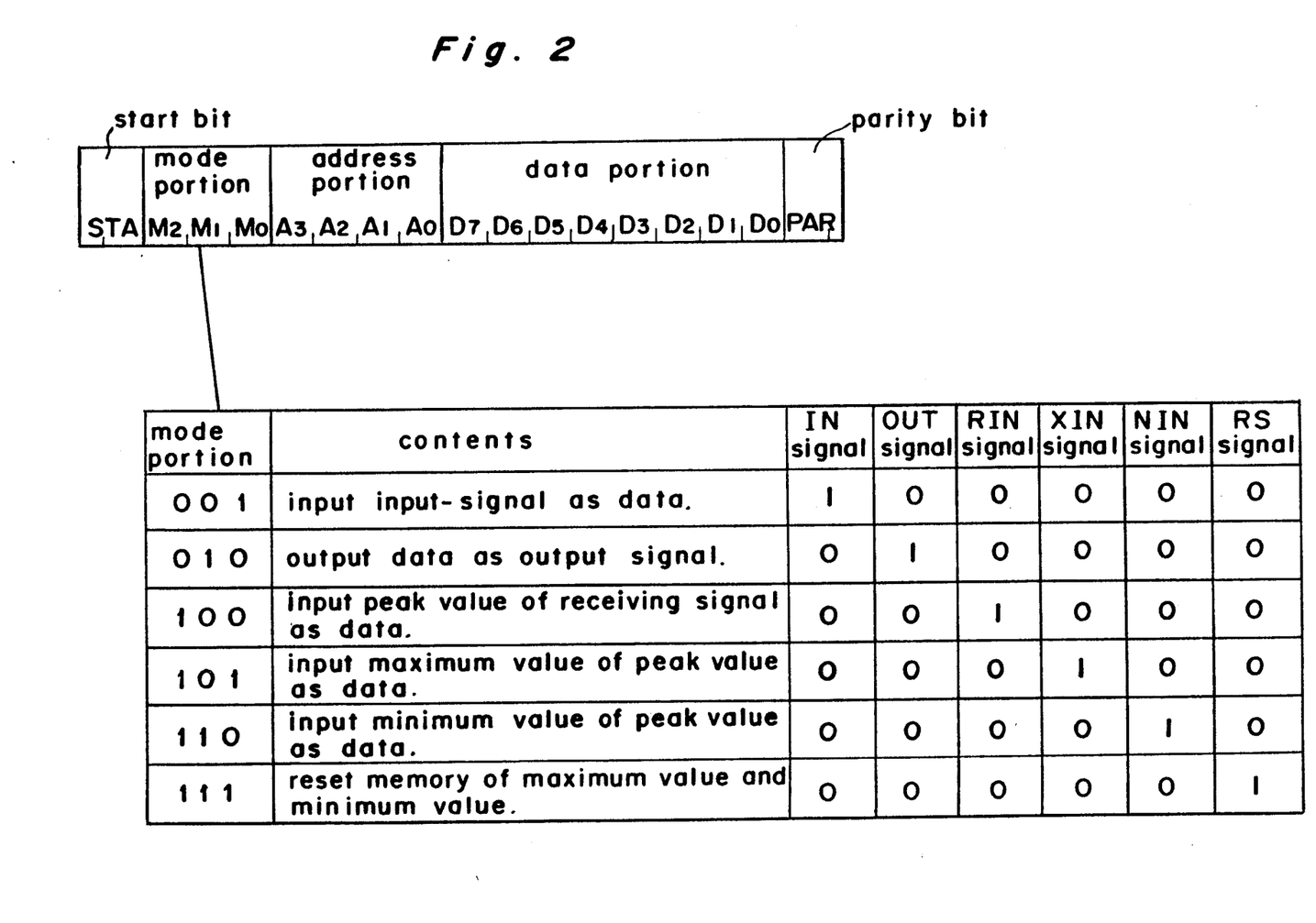
FIG. 2 is a transmission format chart of the serial the present embodiment.

Referring now to the drawings, there is shown in FIGS. 1 a block diagram of a follower station of a loop-shaped data transmission apparatus in an embodiment of the present invention, which includes an optical fiber 7, an (optical-to-electrical) transducer 8, an (optical-to-electrical) transducer 9 into which the SND signal of the digital signal as the transmission signal is inputted, an address conformity detecting circuit 15, an address setting switch 16, an output latching circuit 17, an input interface circuit 20, an output interface circuit 21, a circuit for detecting transmission errors 22 which has the same function as that of the conventional embodiment in that it outputs an ERR signal in the error generation and which detects transmission error using a parity bit, a mode deciding circuit 24 which analyzes the information of the mode portion as shown in FIG. 2 so as to output RIN, XIN, NIN, RS signals in addition to IN, OUT signals, AND gate circuits 25, 26, 27, 28, an inverter 29, and an OR gate circuit 30. The input interface circuit 20 has an output buffer circuit built in, wherein the input signal appears on the output side only when the IN signal is on. A shift register circuit 31 is provided which is $I_7$ in bit as $I_7$ in the serial information, wherein the information $I_7$ through $I_0$ of the input interface circuit 20 and the information $I_{R7}$ through $I_{R0}$, $I_{X7}$ through $I_{X0}$, $I_{N7}$ through $I_{N0}$ of the output buffer circuits 40, 41, 42 are loaded in parallel by a $LD_2$ signal and a RCV signal may be inputted in series at a timing of the SFT signal as a shift pulse, and at the same time a serial information is outputted sequentially from a most-significant-bit (MSB) by a SFT signal. A timing control circuit 32 is provided for controlling the latch timings into the shift register 31, the output latch circuit 17, a parity generating circuit of the input data 33 for generating all the parity bits of parallel information inputs $I_7$ through $I_0$ to the shift register, addresses $A_3$ through $A_0$ and mode information $M_2$ through $M_0$, the output signal $I_P$ as parity bit which is given a least-significant-bit (LSB) information of the parallel input information of the shift register 31, with a RCV signal being a received signal with an optical signal being shaped into a digital signal, and an AOUT signal is an analog output signal proportional to the strength of the light, with an optical signal being.

The parity bit of the transmission format of FIG. 2 and the transmission error detection will be described hereinafter. When the master station transmits the serial information, a setting operation (in the embodiment, "1" is provided in the odd number) into the parity bit through the removing of all the parities of the mode portion, the address portion, the data portion except for the start bit of the contents thereof. The transmission error detecting circuit 22 of the follower station inputs a received signal RCV and outputs a transmission error signal ERR when a serial information which does not conform to the rule is received. When the ERR signal does not become "1", the timing pulses $LD_0$ through $LD_2$ of the outputs of the AND gate circuits 25, 26, 27 are not generated.

Returning to FIG. 1 again, an amplifier 34 amplifies the analog output signal AOUT of the transducer 8. A peak value hold circuit 35 receives the output of the amplifier so as to detect and retain the peak voltage corresponding to a maximum light-amount value, the resetting of the peak value retention being effected in accordance with a $T_0$ signal. An analog.digital conversion circuit 36 converts the value of the analog output $V_p$ of the peak value holding circuit 35 into a digital value, and the output thereof is inputted into the display instrument 37 and represented in numerals. The conversion start timing of the analog to digital conversion circuit 36 is effected in accordance with a $T_1$ signal. The maximum value decision memory circuit 38 compares a maximum value of the peak value of the digitized AOUT signal with a new received-light-amount level value in accordance with a timing of the $T_3$ signal so as to rewrite the value, when the new value is larger, as the maximum value and to store it, with the memory circuit having a function of resetting the memory contents with a $LD_1$. A minimum value decision storing circuit 39, which is similar in construction, keeps the minimum value stored. Output buffer circuits 40, 41, 42, wherein either data of the new value or the maximum value, the minimum value of the peak values is selected when one of the output RIN, XIN, NIN signals of the mode decision circuit 24 is turned on, so that the output thereof becomes the parallel input information of the shift register 31. It is to be noted that $+V_{cc}$ shows that the input logic is "1". Also, further two numeral display apparatuses not shown are respectively connected with the output of a maximum value decision storing circuit 38 and the output of the minimum value decision circuit 39.

Figure 3:
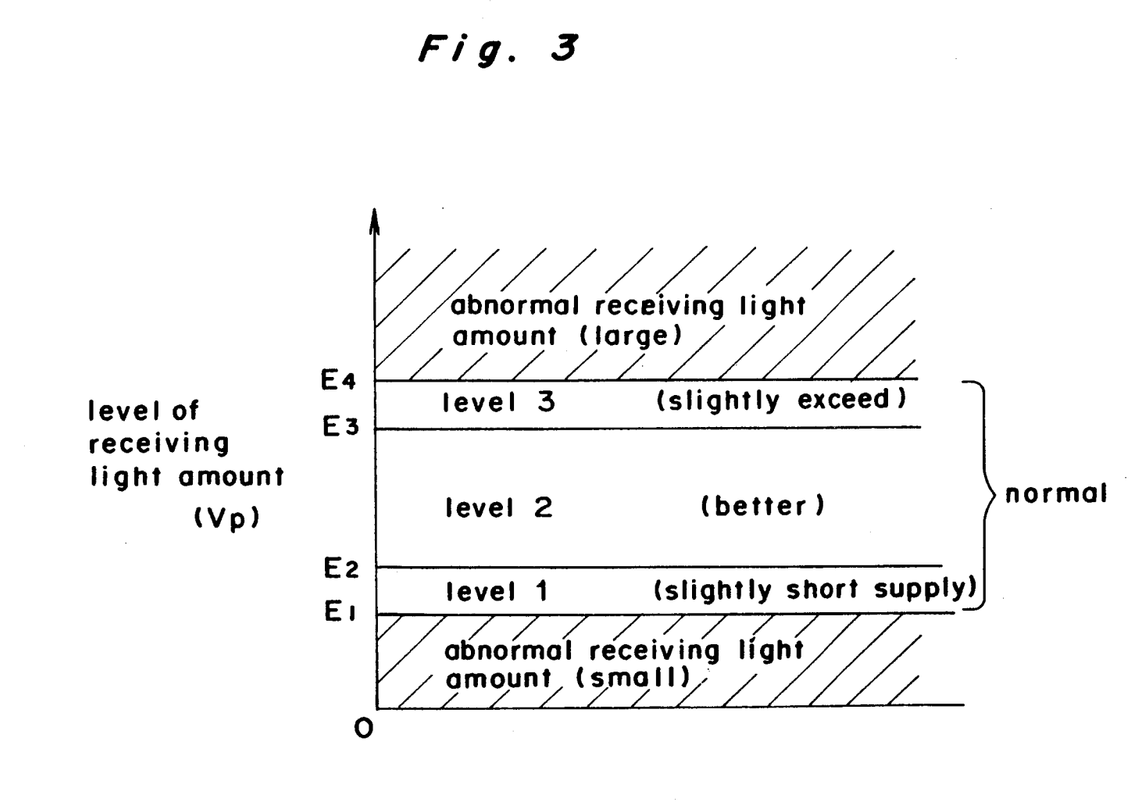
FIG. 3 is a graph showing the relationship of the normality and abnormality judgement of the received-light-amount level of the follower station.
Figures 4, 4A:
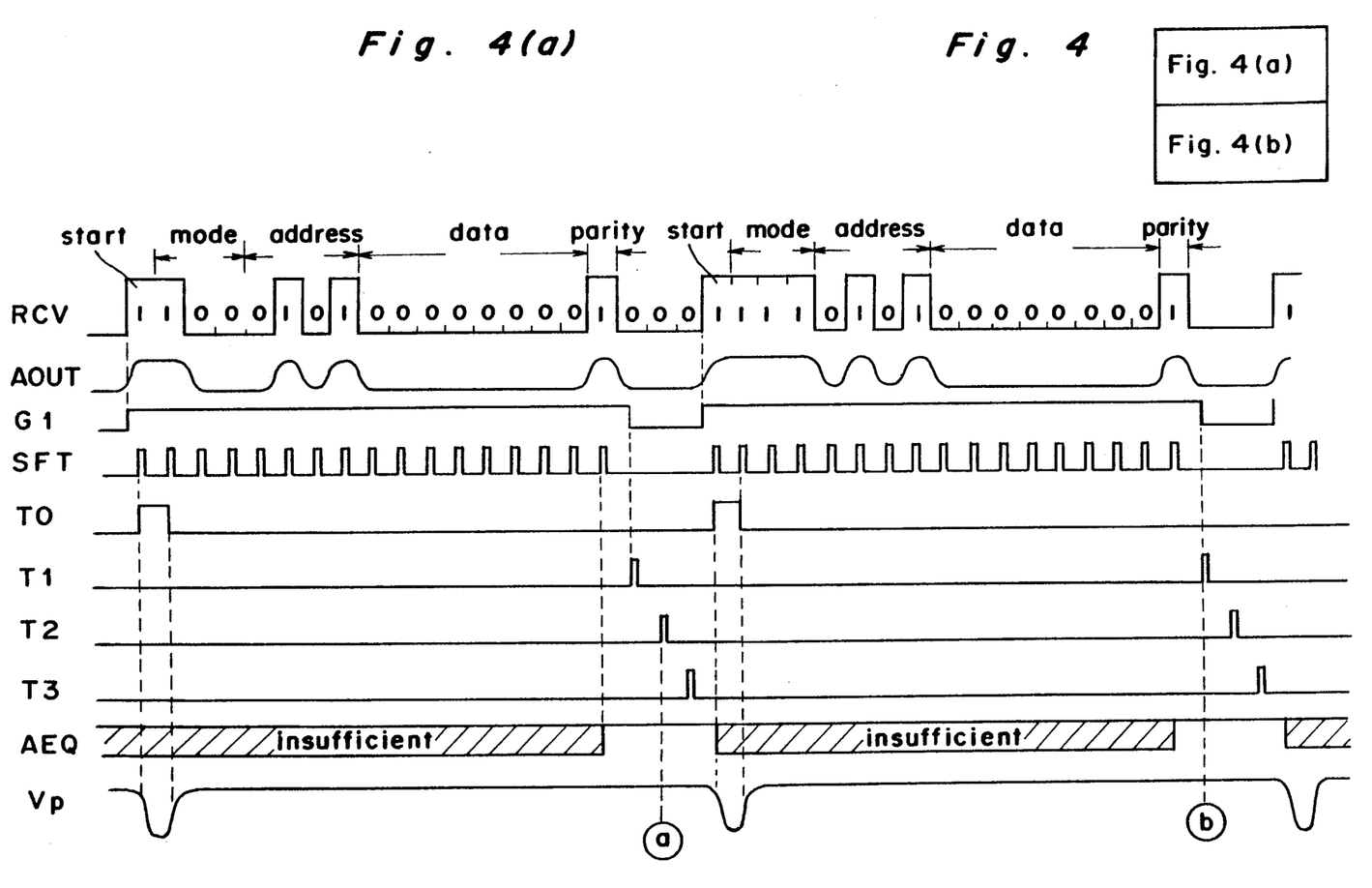
FIGS. 4, 4a and 4b are timing chart of the follower station of FIG. 1.
Figure 4B:
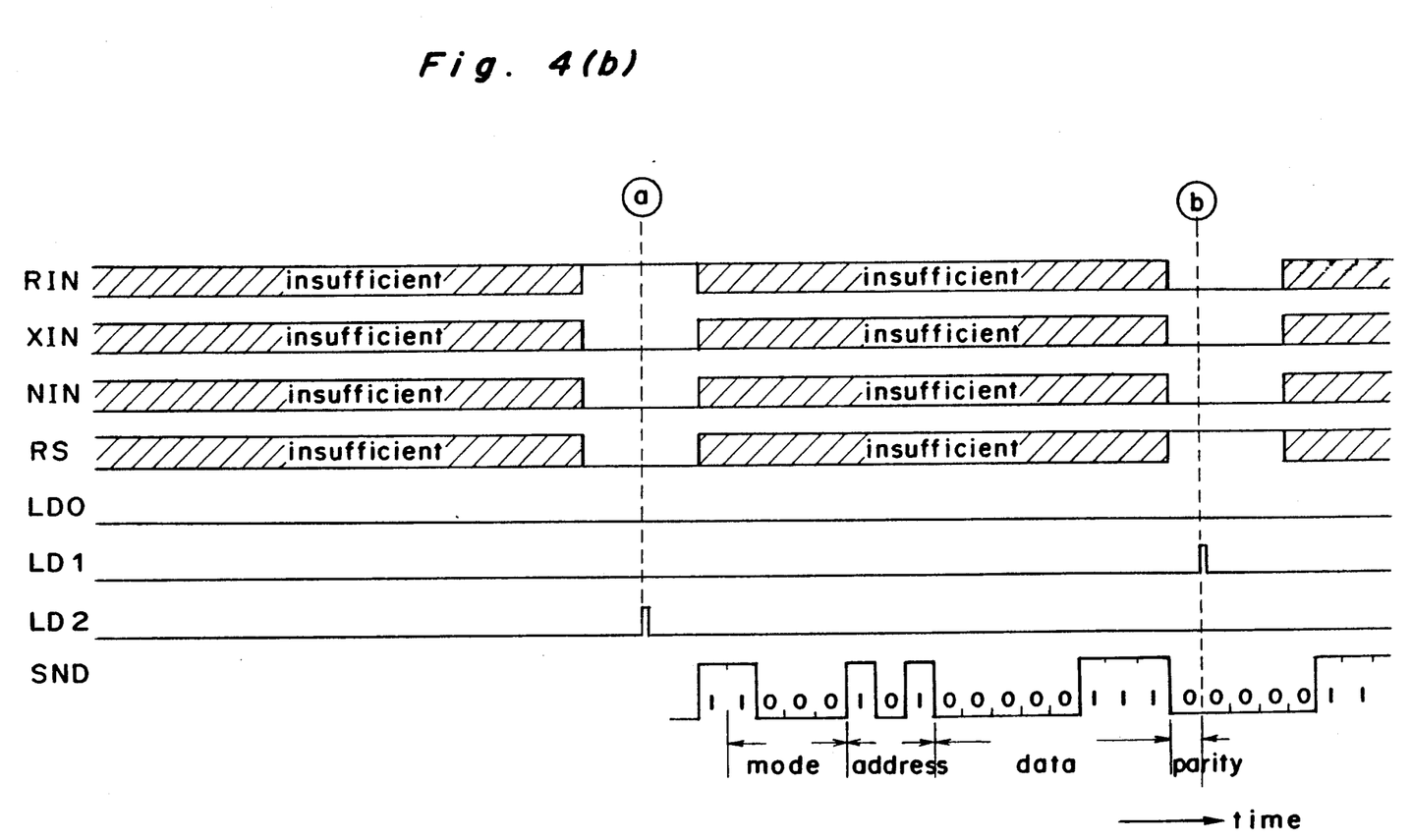

FIG. 3 is a chart showing the normal and abnormal condition abnormality, abnormality of the level of the received-light-amount of the transducer 8, wherein the received-light-amount is abnormal at $E_1$ or lower and at $E_4$ or more in voltage. The received light level is set within the range of the normal level 2 through the adjustment of the pattern on the light-emitting side of the previous station. The received light amount becomes a level 1 or a level 3 condition because of an inferior wiring condition, optical fiber modification or the like. If the digitized received signal RCV comes out correctly, the received light amount is slightly insufficient or excessive. In this condition, by another look at the wiring condition of the optical fiber of the follower station, the troubles of the facility may be prevented from being caused. As the master station specifies an address so that the received-light-amount level of the follower station may be checked for such reasons as described hereinabove, the master station transmits the serial information of "100" through "111" in the mode portion so as to examine the received-light-amount level of the follower station. FIG. 4 is a timing chart of one example thereof. A user may check the level of the received-light-amount of the follower station at each time by the numeral display instrument 37 of FIG. 1.

FIG. 4 is a timing chart of the follower station, showing a case where two serial information have been transmitter from the master station. The former half thereof shows a case where the mode portion has received the information of "100", while the latter half shows a case where it has received the information of the content of the "111". In the former half, the follower station outputs as a transmission signal SND the data of the new received-light-amount of the follower station, and thus expresses the state of loading into the shift register 31. The latter half shows the state of resetting the maximum value and the minimum value of the level of the received-light-amount.

The timing control circuit 32 starts its operation by the rising of the start bit of the received signal RCV so as to sequentially output the shift pulse SFT synchronized with the received serial information by 17 pulses of the whole bit length portion. At the same time, the signal $G_1$ for controlling the output of the transmitting signal SND is made "1", the data of the previous time portion is outputted sequentially into the transducer 9 by the shift register 31. The contents of the outputs $M_2$ through $M_0$ of the shift register at a time point when 17 shift pulses SFT have come out are "100". Thus, the mode decision circuit 24 turns the RIN signal only into "1". At the head of the RCV signal, the $T_0$ signal is outputted, so that the output $V_p$ of the peak value hold circuit 35 is once turned to zero. When the address of the follower station is turned to "0101", it conforms to the address portion of the serial information, so that the output AEQ of the address conformity detecting circuit 15 becomes "1". As the RIN signal is "1" at a time point when 17 SET signals have been outputted, the output selection of the output buffer circuit 40 is maintained, so that the data $I_{R7}$ through $I_{R0}$ of the level of the new received-light-amount which is the content thereof becomes the parallel data input of the shift register 31. At this time, the parity bit $I_P$ is produced by the parity generating circuit 33.

As the inputting conditions of the AND gate circuit 26 are adjusted when the $T_2$ signal is outputted, a $LD_2$ signal which becomes a load timing of the parallel data of the shift register 31 is outputted and the content of the data portion of the shift register 31 is replaced by the content of the above-described $I_{R7}$ through $I_{R0}$. In the embodiment, it is "00000111", with the parity portion becoming "0". When the information of the 17 bits produced thus receives the next received signal, it is outputted as the SND signal of the latter half portion of the drawing.

The timing chart of the latter half portion of FIG. 4 will be described.

As the content of the mode portion is "111" in this case, the output of the mode deciding circuit 24 becomes "1" only in the RS signal at a time point where seventeen SFT signals have been outputted. As the inputting condition of the AND gate circuit 27 is adjusted when the $T_1$ signal is outputted from the timing control circuit 32, the $LD_1$ signal is outputted, so that the memory contents of the maximum value decision circuit 38 and the minimum value decision circuit 39 are reset. When the load timing signal $LD_1$ into the shift register 31 is not outputted, it is outputted as it is and becomes a transmission signal SND when a receiving signal RCV receives the next serial information.

The above-described description is presented in which no transmission errors are provided. When the transmission errors exist, the ERR signal becomes "1", so that the inputting conditions of the AND gate circuits 25, 26, 27 are not met, thus resulting in no operation to be effected. In this case, the master station finds the transmission error of the returned serial information and transmits the same contents again.

When the content of the maximum value storing circuit is inputted, the serial information with the content of the mode portion being "101" therein is transmitted by the master station, so that the content is carried out with only the XIN signal becoming "1" as shown in the timing chart of the former half portion of FIG. 4. Also, the content of the minimum value storing circuit is carried out . when the NIN signal becomes "1" with the contents of the mode portion being "110".

As described in the explanation of FIG. 3, the object may be achieved if the level of the received light amount in the follower station may be found at the four stages of $E_1$ through $E_4$. A voltage comparator and an light emitting diode, instead of an analog.digital transducer 36 and a numeral display instrument 37, may be used in the circuit as in shown in FIG. 5.

Figure 5:
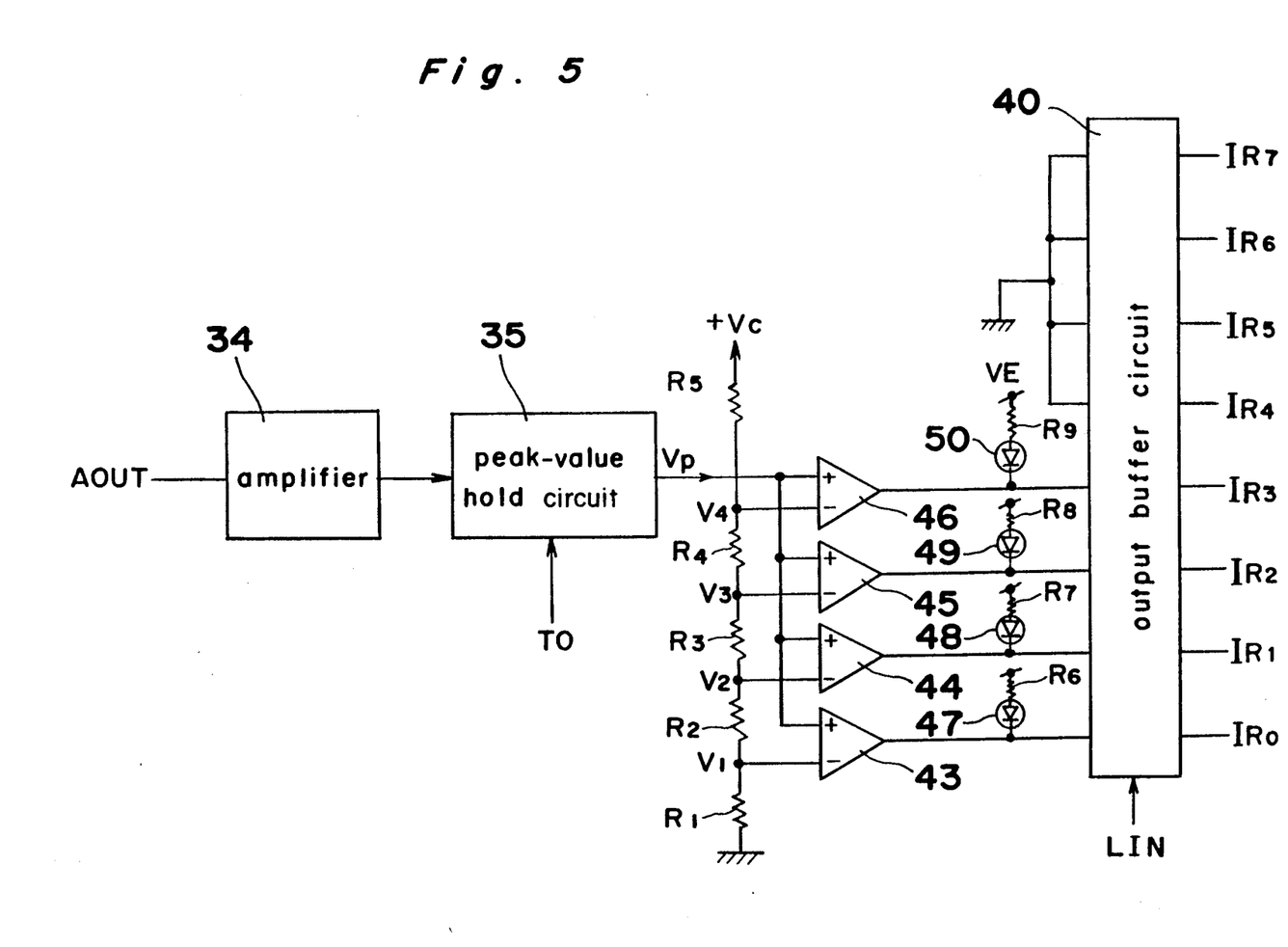
FIG. 5 is a diagram in another embodiment of a circuit for digitizing the level of the received-light-amount of the present invention.

In FIG. 5, the analog signal AOUT proportional to the received light signal from the transducer 8 is amplified by an amplifier 34. The peak value hold circuit 35 retains the voltage $V_P$ of the peak thereof. The outputs of the voltage comparators 43 through 46 are inputted into the shift register 31 of FIG. 1 through the output buffer circuit 40. Also, the condition thereof may be seen by the light emitting diodes 47 through 50. The input voltages $V_1$ through $V_4$ of the voltage comparators 43 through 46 are divided in voltage by the resistors $R_1$ through $R_5$ and are set into the voltage corresponding to $E_1$ through $E_4$ of FIG. 3. The $T_0$ signal is a signal which once discharges the peak voltage retained by a reset signal of the peak value hold circuit 35 and turns it into zero.

Figure 6:
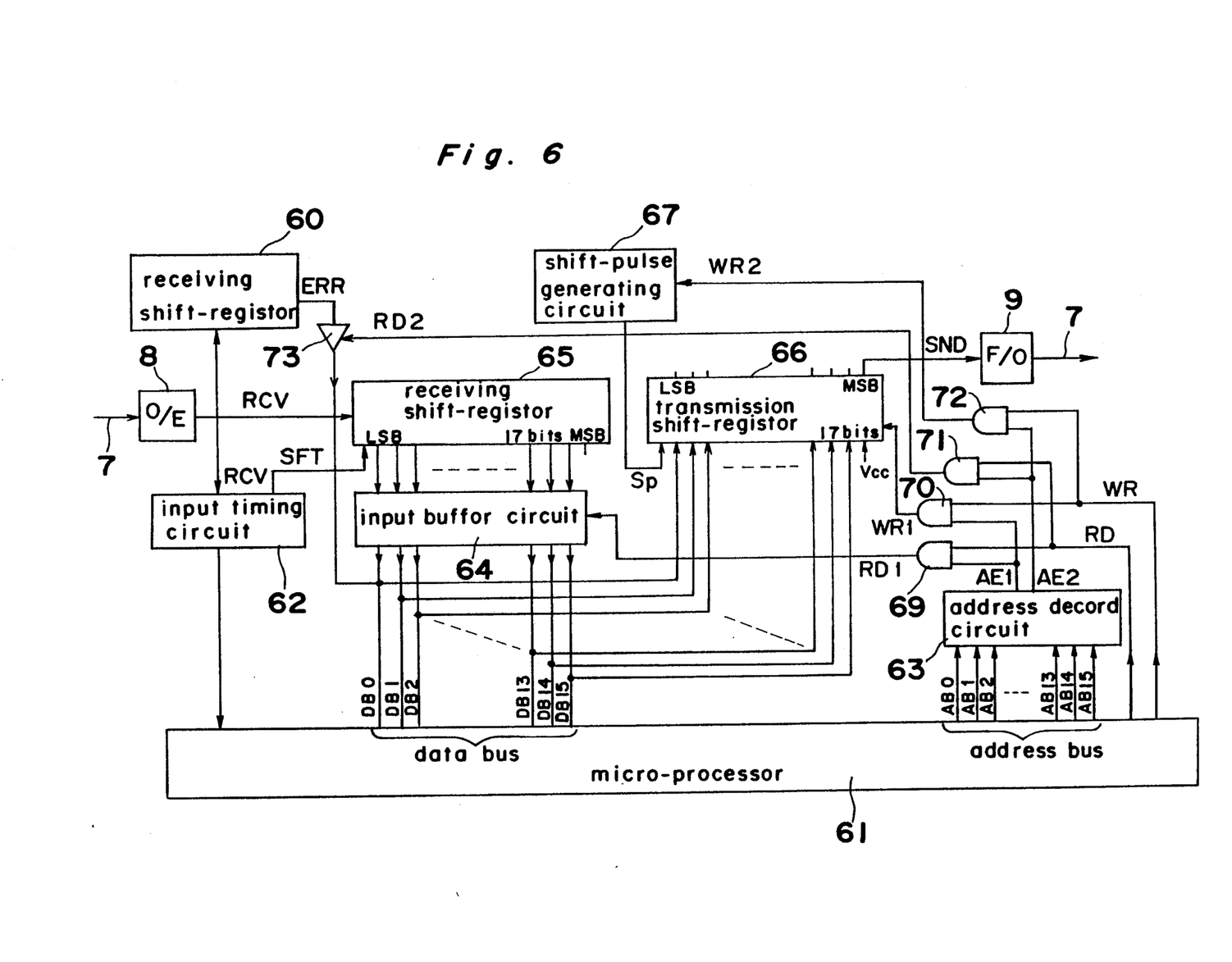
FIG. 6 is a circuit block diagram of a master station of the embodiment.
Figure 7:
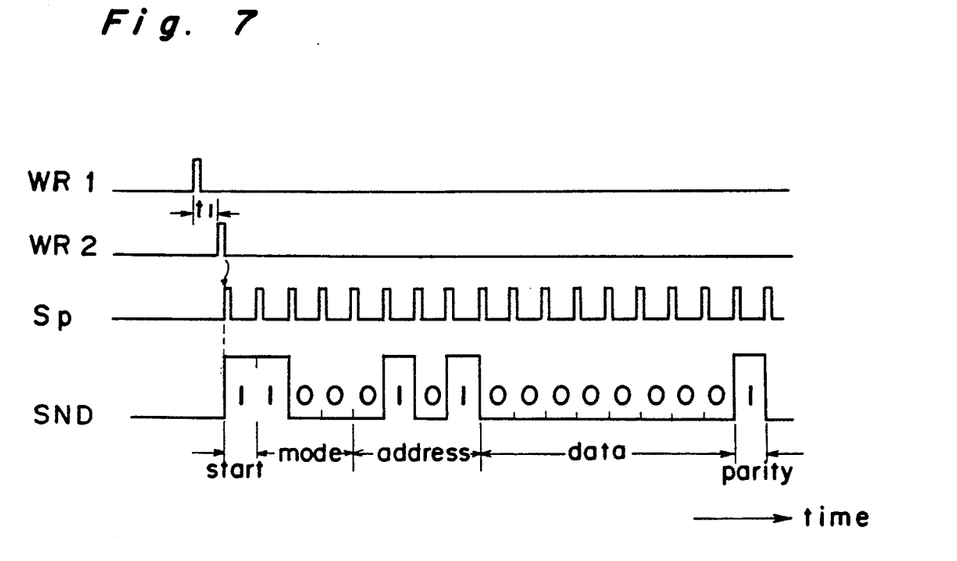
FIG. 7 is a timing chart in a case of the master-station transmission.

FIG. 6 shows a block diagram of the master station of the present invention FIG. 6 shows a timing chart in the case of a transmission. FIG. 7 is a timing chart in the case of a reception.

FIG. 6 shows a transmission error detecting circuit 60 of a received signal RCV which is completely the same as that of FIG. 1, a microprocessor 61, an input timing controlling circuit 62 for receiving the received signal RCV so as to output an interruption iRTl into the microprocessor 61 and a shift pulse SFT, an address decoding circuit 63, an input buffer circuit 64 as a interface circuit with respect to the microprocessor, a shift register 65 for reception use, a shift register 66 for transmission use which is capable of loading the parallel input data, a shift pulse generating circuit 67 for generating a transmission signal SND, AND gates 69 through 72, and buffer gate circuit 73.

FIG. 7 is a timing chart, wherein a master station outputs the transmission signals SND of "100" into a mode portion of the serial information, and of "0101" into an address portion thereof. This is a timing chart depicting an operation which tries to check the new value of the received-light-amount level of the received signal of the follower station, corresponding to the former half portion of the timing chart of the above-described FIG. 4. A starting operation is effected by a program of the fault examination of the follower station of the microprocessor 61 of the master station. The mode portion "100" and the address portion "0101" of the follower station, "00000000" as the data portion, "1" as a parity bit for them are computed, "1000101000000001" as the data corresponding to them are set into the data buses $DB_{15}$ through $DB_0$. Then, a storing signal $WR_1$ is outputted and latched into a shift register 66. Then, after some hours, the starting signal $WR_2$ is outputted into the shift pulse generating circuit 67. As the eighteen shift pulses SP are outputted into the shift register 66 for transmission use by the shift pulse generating circuit 47, the above-described contents are outputted from the MSB sequentially as shown in FIG. 7 and become a transmission signal SND.

Figure 8:
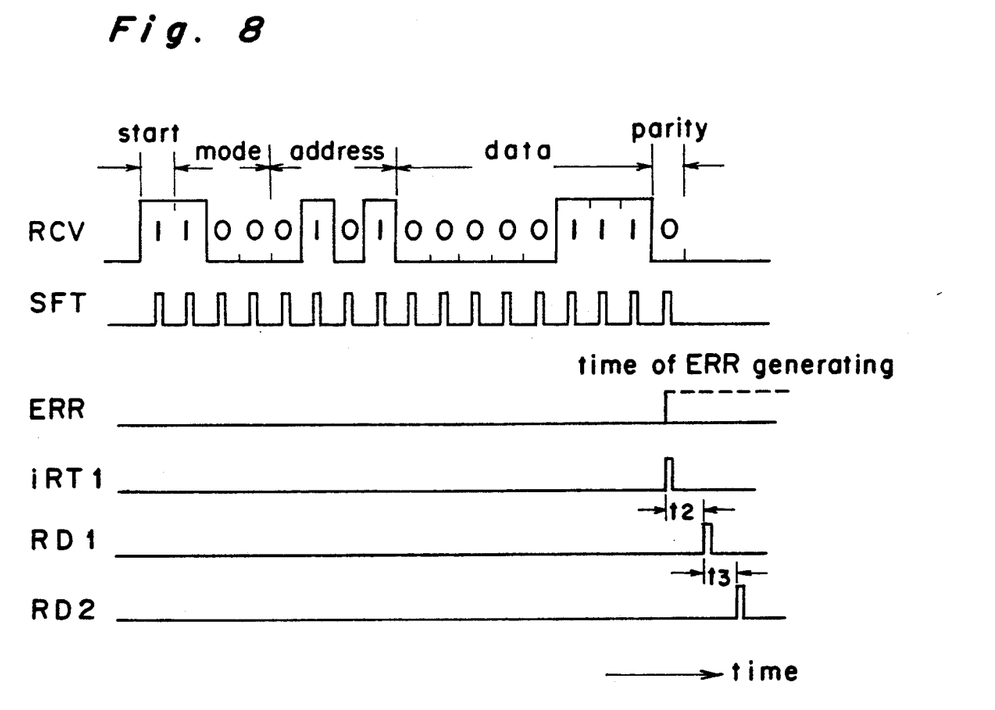
FIG. 8 is a timing chart in a case of the master-station reception.

A case where the above-described signal has returned by way of the transmission path of the optical fiber loop will be described with reference to FIG. 6 and FIG. 8. Upon receiving the received signal RCV, the shift pulse SFT signal which is synchronized with the received signal RCV by the input timing controlling circuit 62 is outputted by seventeen, so that the received signal RCV becomes a parallel data by a shift register 65 for reception use. As an interruption iRTl is outputted into the microprocessor 61 at the same timing as that of the seventeenth SFT signal, it is received so as to start the reception program of the microprocessor 61. The contents of the program first outputs the $RD_2$ signals to load the contents of the received signal RCV through an input buffer circuit 64. In order to check the absence of the transmission error, the $RD_2$ signal is outputted and the ERR signal is inputted. If "0" is provided, the mode portion and the address portion are decoded to effect the corresponding control and the fault examination. In the example of FIG. 8, the content of the mode portion is "100" so that the received-light-amount of the follower station of "0101" in address is found out to be "00000111" (=7). If the ERR signal is "1", the serial information of FIG. 7 is transmitted again. When the content of the mode portion is turned into "101" or "110", the minimum value and the maximum value of the received-light-amount level of an optional follower station may be provided in a similar procedure.

In the manner as described hereinabove, the master station obtain the received-light-amount level of the follower station and judges where the value is in the range of the above-described FIG. 3. The master station displays a warning together with an address denoting a follower station having something wrong with the received-light-amount level.

After the completion of the check, the memories of the maximum value decision storing circuit of the follower station and the minimum value memory deciding circuit thereof are reset, so that the serial information of the contents of "111" as the model portion is transmitted.

As is clear from the foregoing description, according to the first embodiment of the present invention, as the respective follower stations renew the peak of the optical signal received every time to retain it, and digitalized the peak thereof so as to display it, it may be immediately found out whether or not a wiring of the optical fiber of which follower station is inferior, deteriorated or the like or whether or not the level thereof is such just prior to the time the wiring becomes inferior, so that the fault detection and maintenance are extremely simplified.

According to the second embodiment, the maximum value and the minimum value among the peak values of the serial information to be received one after another are stored, are digitized, and are displayed. It may be judged by the difference among them whether or not the influences are applied directly upon the optoelectronic transducer by the light amount variation, noises or the like caused through the bending of the fiber established on the movable portion for many hours. Accordingly, the reliability of the system may be positively judged.

According to the third and fourth embodiments, in order to know the received-light-amount level in accordance with the follower station of the first embodiment, and the follower station of the second embodiment, the information coded so that the contents of the mode portion of the serial information between the master station and the follower station may be discriminated from the normal inputting and outputting operations may be transmitted and received so as to allow the received-light-amount level of an optional follower station to be loaded in the master station. Thus, the address numbers of the defective follower stations may be collectively displayed through the judging operation of the value.

As the levels of the received-light-amount of the all the follower stations may be collectively observed at the master station, the fault discovery and maintenance of the follower stations are simplified, thus contributing greatly towards improvements in the reliability of the automatic machines.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A fault examining apparatus for a loop network data transmission system in which a master station and a plurality of follower stations are sequentially connected in a loop transmission path of one optical fiber to effect transmission of digital optical signals carrying serial data information, characterized in that the serial data information is composed of a header portion, a data portion, an address portion for specifying a particular follower station, a check code portion for judging an absence of a transmission error of the serial data information, and a mode portion, wherein the contents of the mode portion are coded so that they may be differentiated into at least one of at least six cases, a first case where data from a follower station are inputted, a second case where data are outputted to a follower station, a third case where a present value of a received-light-amount level of received digital optical signals of each reception is inputted from a follower station, a fourth case where a maximum value of the reception-light-amount level is inputted, a fifth case where a minimum value of the received-light-amount level is inputted, and a sixth case where a maximum value memory means and a minimum value memory means of the received-light-amount level of the received signal are reset, wherein each of the follower station comprises: a received-light-amount detecting means for detecting a peak level value of a light amount of received optical signals and for renewing the detected peak level value at each reception; a present value storing means for digitizing and storing the peak level value detected by said detecting means; a maximum value storing means and a minimum value storing means for respectively storing and updating a maximum value and a minimum value of the peak level value stored by said present value storing means; a received-light-amount data selecting means for selecting from among said present value storing means, said maximum value storing means and said minimum value storing means when the contents of the mode portion of the serial data information are differentiated as one of said third case, said fourth case or said fifth case; a serial information producing means for rewriting the contents of the received-light amount data selecting means into the data portion of the serial data information so as to produce new serial data information when the address portion conforms to an address of the follower station; a transmitting means for transmitting the new serial data information; a memory resetting means for resetting the contents of said maximum value storing means and said minimum value storing means when the contents of the mode portion are differentiated as said sixth case; and wherein the master station comprises: a means for transmitting the serial data information with the contents of the mode portion being one of the cases related to the received-light-amount level; a received-light-amount level displaying means for decoding received serial data information so as to display the data portion thereof for each of the follower stations when the contents of the code portion are differentiated as one of said third case, said fourth case or said fifth case.

2. A fault examining apparatus for a loop network data transmission system in which a master station and a plurality of follower stations are sequentially connected in a loop transmission path of one optical fiber to effect transmission of digital optical signals carrying serial data information, said apparatus being provided in association with at least one of the follower stations and comprising: a received-light-amount level detecting means for detecting a peak level value of a light amount of received optical signals and for renewing the detected peak level value at each reception; a present value storing means for digitizing and storing the peak level detected by said detecting means; a maximum value storing means and a minimum value storing means for respectively storing and updating a maximum value and a minimum value of the peak level value stored by said present value storing means; and, a display means for displaying contents of said present value storing means, said maximum value storing means and said minimum value storing means.

3. A fault examining apparatus for a loop network data transmission system in which a master station and a plurality of follower stations are sequentially connected in a loop transmission path of one optical fiber to effect transmission of digital optical signals carrying serial data information, characterized in that the serial data information is composed of a head portion, a data portion, an address portion for specifying a particular follower station, a check code portion for judging an absence of a transmission error of the serial data information, and a mode portion, wherein the contents of the mode portion are coded so that they may be differentiated into at least one of at least three cases, a first case where data from a follower station are inputted, a second case where data are outputted to a follower station, and a third case where a present value of a peak level value of received digital optical signals of each reception is inputted from a follower station, wherein each of the follower stations comprises: a received-light-amount level detecting means for detecting a peak level value of a light amount of received digital optical signals and for renewing the detected peak level value at each reception; a present value storing means for digitizing and storing the peak level value detected by said detecting means; a serial information producing means for rewriting the data portion of the serial data information into the present value storing means so as to produce new serial data information when the address portion conforms to an address of the follower station in a case where the contents of the mode portion of the serial data information denotes an input of the present value of the received-light amount level; and a transmitting means for transmitting the new serial data information; and wherein the master station comprises: a means for transmitting the serial data information with the mode portion being a content into which the present value of the peak level value is inputted; a received-light-amount level displaying means for decoding received serial data information so as to display the data portion thereof for each follower station when the mode portion is a content into which the present value of the peak level value is inputted.

* * * * *

UNITED STATES PATENT AND TRADEMARK OFFICE
CERTIFICATE OF CORRECTION

PATENT NO. : 5,119,222
DATED : June 2, 1992
INVENTOR(S) : Yoshifumi HARA et al.

It is certified that error appears in the above-identified patent and that said Letters Patent is hereby corrected as shown below:

On title page, item [73], the address of the Assignee should be changed from "Oazakadoma, Japan" to --Osaka-fu, Japan--.

Signed and Sealed this

First Day of March, 1994

Attest:

BRUCE LEHMAN

*Attesting Officer*   *Commissioner of Patents and Trademarks*